United States Patent
Rodriguez Bravo

(10) Patent No.: US 11,488,189 B2
(45) Date of Patent: Nov. 1, 2022

(54) INTERACTIVE LOYALTY REWARDS STRUCTURE

(71) Applicant: KYNDRYL, INC., New York, NY (US)

(72) Inventor: Cesar Augusto Rodriguez Bravo, Alajuela (CR)

(73) Assignee: KYNDRYL, INC., New York, NY (US)

( * ) Notice: Subject to any disclaimer, the term of this patent is extended or adjusted under 35 U.S.C. 154(b) by 332 days.

(21) Appl. No.: 16/202,352

(22) Filed: Nov. 28, 2018

(65) Prior Publication Data

US 2020/0167814 A1   May 28, 2020

(51) Int. Cl.
*G06Q 30/02*       (2012.01)
*G06Q 50/00*       (2012.01)

(52) U.S. Cl.
CPC ..... *G06Q 30/0209* (2013.01); *G06Q 30/0226* (2013.01); *G06Q 50/01* (2013.01)

(58) Field of Classification Search
CPC ........... G06Q 30/0209; G06Q 30/0226; G06Q 50/01; G06Q 30/0261; G06Q 30/0207
See application file for complete search history.

(56) References Cited

U.S. PATENT DOCUMENTS

| | | | |
|---|---|---|---|
| 7,996,264 B2 | 8/2011 | Kusumoto | |
| 8,719,077 B2 * | 5/2014 | Titus | G06Q 30/0222 379/114.03 |
| 9,449,343 B2 | 9/2016 | Mayerle | |
| 9,626,689 B1 * | 4/2017 | Bethke | A63F 13/85 |
| 10,666,921 B2 * | 5/2020 | Christensen | G06Q 30/0263 |
| 11,288,661 B2 * | 3/2022 | Hammad | G06Q 20/326 |
| 2002/0070270 A1 | 6/2002 | Narita | |
| 2004/0267621 A1 * | 12/2004 | Schuller | G06Q 30/0225 705/16 |
| 2008/0059304 A1 * | 3/2008 | Kimsey | G06Q 30/0209 705/14.12 |

(Continued)

FOREIGN PATENT DOCUMENTS

CN       102202256 A    9/2011

OTHER PUBLICATIONS

Jerry Jao, Customer Retention Is King: The Future Of Retention Marketing, Forbes, 2015, entire document, https://www.forbes.com/sites/jerryjao/2015/01/21/customer-retention-is-king-retention-marketing-provides-greater-roi/#68243b6c32cf.

(Continued)

*Primary Examiner* — Waseem Ashraf
*Assistant Examiner* — Robert C Johnson
(74) *Attorney, Agent, or Firm* — Erik Swanson; Andrew M. Calderon; Calderon Safran & Cole P.C.

(57) ABSTRACT

Aspects identify an item that is offered for sale at a retailer location in association with a sales promotion, in response to determining that a mobile device of a user is within a threshold location proximity to the retailer location. Embodiments determine an in-game virtual reward value for awarding to the user within a virtual game that is executing on the mobile device as a function of gaming profile data of the user; and present an offer to the user within the virtual game to award the determined in-game virtual reward value to the user in consideration for an engagement by the user with the identified item that meets a term of the sales promotion.

18 Claims, 5 Drawing Sheets

(56) References Cited

U.S. PATENT DOCUMENTS

| | | | |
|---|---|---|---|
| 2008/0120221 | A1 | 5/2008 | Toneguzzo |
| 2010/0228617 | A1* | 9/2010 | Ransom ............. G06Q 30/0236 709/204 |
| 2011/0307340 | A1* | 12/2011 | Benmbarek ............ G06Q 50/01 705/14.73 |
| 2012/0157211 | A1* | 6/2012 | Kane ..................... A63F 13/533 463/42 |
| 2012/0253908 | A1* | 10/2012 | Ouimet ................. G06Q 30/02 705/14.23 |
| 2013/0231990 | A1* | 9/2013 | Munjal ................. G06Q 30/06 705/14.23 |
| 2013/0339112 | A1* | 12/2013 | Palexas ............. G06Q 30/0209 705/14.12 |
| 2014/0378220 | A1* | 12/2014 | Fuller ................... A63F 13/822 463/31 |
| 2015/0127445 | A1 | 5/2015 | Jaffee |
| 2015/0254706 | A1* | 9/2015 | Dennehy ............ G06Q 30/0235 705/14.1 |
| 2016/0203352 | A1* | 7/2016 | Marsico ............... G06K 7/1417 235/375 |
| 2016/0239733 | A1* | 8/2016 | Hertz .................... H04W 4/029 |
| 2016/0342939 | A1* | 11/2016 | Jones ................... G06Q 10/087 |
| 2017/0148082 | A1 | 5/2017 | Murahari |
| 2017/0161768 | A1* | 6/2017 | Lopez ................ G06Q 30/0226 |
| 2017/0296919 | A1 | 10/2017 | Margiotta |
| 2018/0089713 | A1* | 3/2018 | Fisher ............... G06Q 30/0226 |
| 2018/0114250 | A1* | 4/2018 | Phillips ................ A63F 13/212 |
| 2018/0158088 | A1* | 6/2018 | Ho ..................... G07F 17/3295 |
| 2019/0034950 | A1* | 1/2019 | Roux ................. G06Q 30/0282 |
| 2019/0066181 | A1* | 2/2019 | Victorin ............... G06Q 10/087 |
| 2019/0080342 | A1* | 3/2019 | Andon .................... H04W 4/21 |
| 2019/0087842 | A1* | 3/2019 | Koenig ................... A63F 13/61 |
| 2019/0091577 | A1* | 3/2019 | Reiche, III ............. A63F 13/46 |
| 2019/0147496 | A1* | 5/2019 | Faraguna ........... G06Q 30/0267 705/14.49 |
| 2019/0158484 | A1* | 5/2019 | Grunewald ............. A63F 13/73 |
| 2019/0180310 | A1* | 6/2019 | Jones ................... G06Q 20/367 |
| 2019/0340631 | A1* | 11/2019 | Seshadri ................ A63F 13/30 |

OTHER PUBLICATIONS

Erika Morphy, Why Are Companies Investing In Customer Retention, CMS Wire, 2017, entire document, Simpler Media Group, Inc., https://www.cmswire.com/customer-experience/why-are-companies-investing-in-customerretention/.

Augustus Franklin, Gamification to Enhance Your Marketing Strategy, 2016, Tweak your Biz, entire document, http://tweakyourbiz.com/marketing/2016/11/14/gamification-to-enhance-your-marketing-strategy.

Alex McEachern, How to Start a Loyalty Program That Keeps Customers Coming Back, Shopify Blogs, 2016, entire document, https://www.shopify.com/blog/117007237-how-to-start-a-loyalty-program-that-keeps-customerscoming-back.

Forbes Staff, Investing in Customer Retention Leads to Greatly Increased Market Share, Says Forbes Insights Study, Forbes Corporation Communications, 2016, entire document, 3. https://www.forbes.com/sites/forbespr/2016/09/14/investing-in-customer-retention-leads-tosignificantly-increased-market-share-says-new-study/#2891685472dc.

Peter Mell et al, The NIST Definition of Cloud Computing, National Institute of Standards and Technology, Publication 800-145, 2011, entire document.

Heather Timney, The rise of retention marketing as a strategic priority in 2017, Marketingland, 2017, entire iocument, 1. https://marketingland.com/rise-retention-marketing-strategic-priority-2017-202503.

Peaksel D.O.O. NIS, My Talking Dog 2—Virtual Pet, Amazon AppStore, Original Release Date 2016, entire document, https://www.amazon.com/My-Talking-Dog-Virtual-Pet/dp/B01IVWRUFG.

* cited by examiner

INTERACTIVE LOYALTY REWARDS STRUCTURE

TECHNICAL FIELD

The present invention relates generally to a method, system, and computer program product for an automated loyalty rewards structure. More particularly, the present invention relates to a method, system, and computer program product for generating loyalty rewards within a virtual gaming environment.

BACKGROUND

Virtual reality and other simulation video games and mobile device applications ("apps") may simulate real or fantasy world activities, via rendering representations or presentations of real-life and fictional entities or activities. In virtual reality games users (players) are immersed within a created world wherein they engage with objects and characters through a first-person perspective; and/or through the use of an avatar, an animated character that moves through the virtual game environment representing the user as the user explores and engages the environment of the game. Thus, users use avatars to engage and manipulate objects (pick up objects, open doors, etc.); the avatars of other users; and "bots," animated characters that do not represent other users, but instead character simulations generated by the gaming environment, application or service.

Virtual reality and simulation games comprehend a variety of types and genres. For example, in "Construction and Management Simulation" (CMS) games players build, expand or manage fictional communities or projects with limited resources. One variety of a CMS game is a life simulation or virtual pet game, wherein a player controls one or more artificial lifeforms or the environments or conditions within which the lifeforms exists, with a goal of caring for and encouraging development and good health of the life forms. Thus, a virtual pet game is generally a pet-care simulation game that focuses on the nurturing, raising, breeding or exhibition of simulated animals, for example, ensuring that the pet gets timely nutrition (meals), in sufficient but not excessive quantities and frequencies, so that the pet thrives, and does not suffer from obesity-related disorders (from over-feeding) or malnutrition (from under-feeding).

Loyalty programs are structured marketing strategies designed by merchants or other retail service providers to encourage customers to shop at or use the services of businesses associated with each program in consideration for rewarding discounts, rewards or other consideration having perceived value by the customer. By engaging in shopping or purchasing activities that are associated to a loyalty program, consumers typically receive a discount on a current purchase price, or an allotment of "points" or other value metrics that they can use for future purchases.

BRIEF SUMMARY

In one aspect of the present invention, a computer implemented method includes identifying an item that is offered for sale at a retailer location in association with a sales promotion, in response to determining that a mobile device of a user is within a threshold location proximity to the retailer location; determining an in-game virtual reward value for awarding to the user within a virtual game that is executing on the mobile device as a function of gaming profile data of the user; and presenting an offer to the user within the virtual game to award the determined in-game virtual reward value to the user in consideration for an engagement by the user with the identified item that meets a term of the sales promotion.

In another aspect, a computer system has a hardware processor in circuit communication with a computer readable memory and a computer-readable storage medium having program instructions stored thereon. The processor executes the program instructions stored on the computer-readable storage medium via the computer readable memory and thereby identifies an item that is offered for sale at a retailer location in association with a sales promotion, in response to determining that a mobile device of a user is within a threshold location proximity to the retailer location; determines an in-game virtual reward value for awarding to the user within a virtual game that is executing on the mobile device as a function of gaming profile data of the user; and presents an offer to the user within the virtual game to award the determined in-game virtual reward value to the user in consideration for an engagement by the user with the identified item that meets a term of the sales promotion.

In another aspect, a computer program product has a computer-readable storage medium with computer readable program code embodied therewith. The computer readable program code includes instructions for execution which cause a processor to identify an item that is offered for sale at a retailer location in association with a sales promotion, in response to determining that a mobile device of a user is within a threshold location proximity to the retailer location; determine an in-game virtual reward value for awarding to the user within a virtual game that is executing on the mobile device as a function of gaming profile data of the user; and present an offer to the user within the virtual game to award the determined in-game virtual reward value to the user in consideration for an engagement by the user with the identified item that meets a term of the sales promotion.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
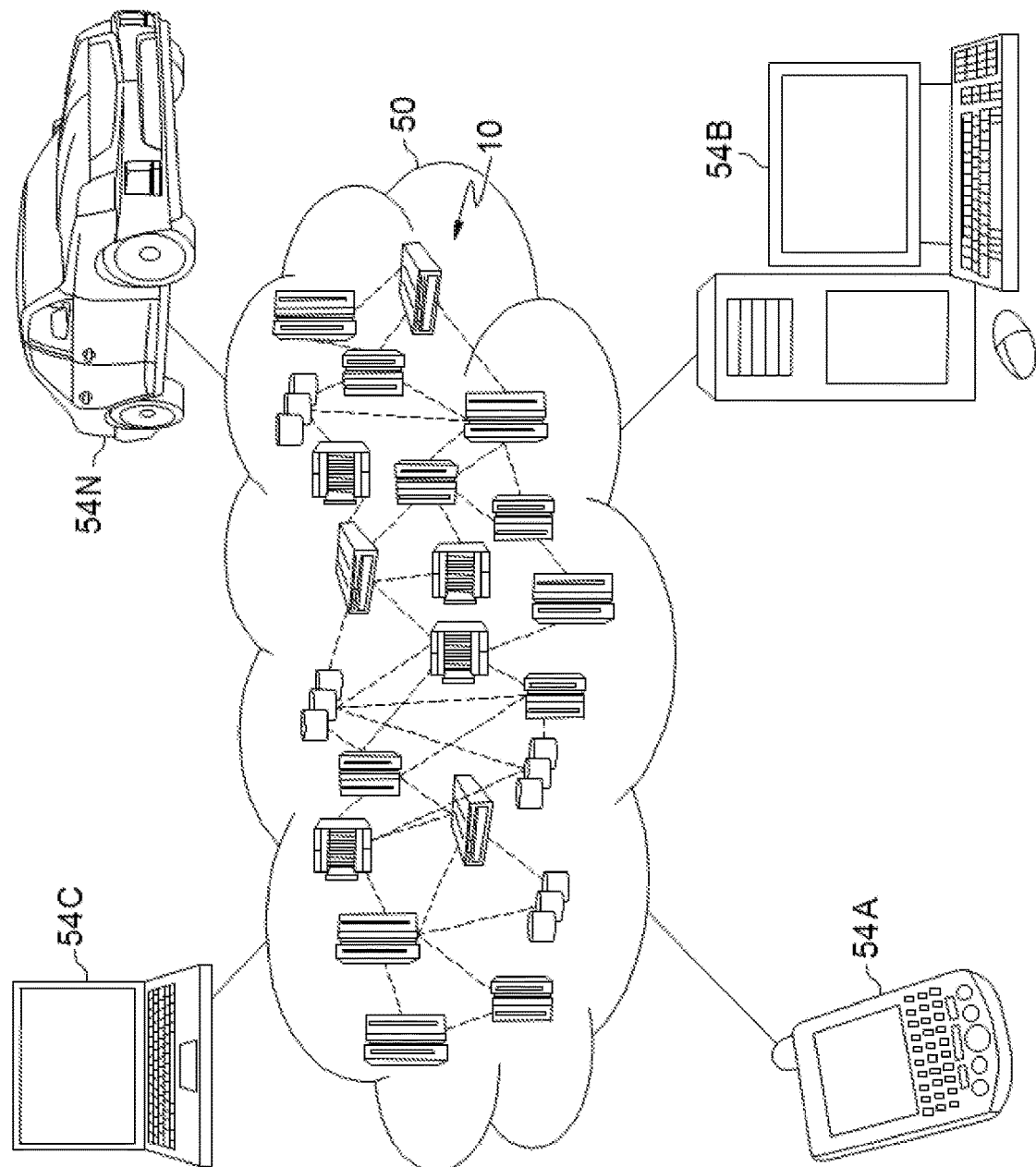
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
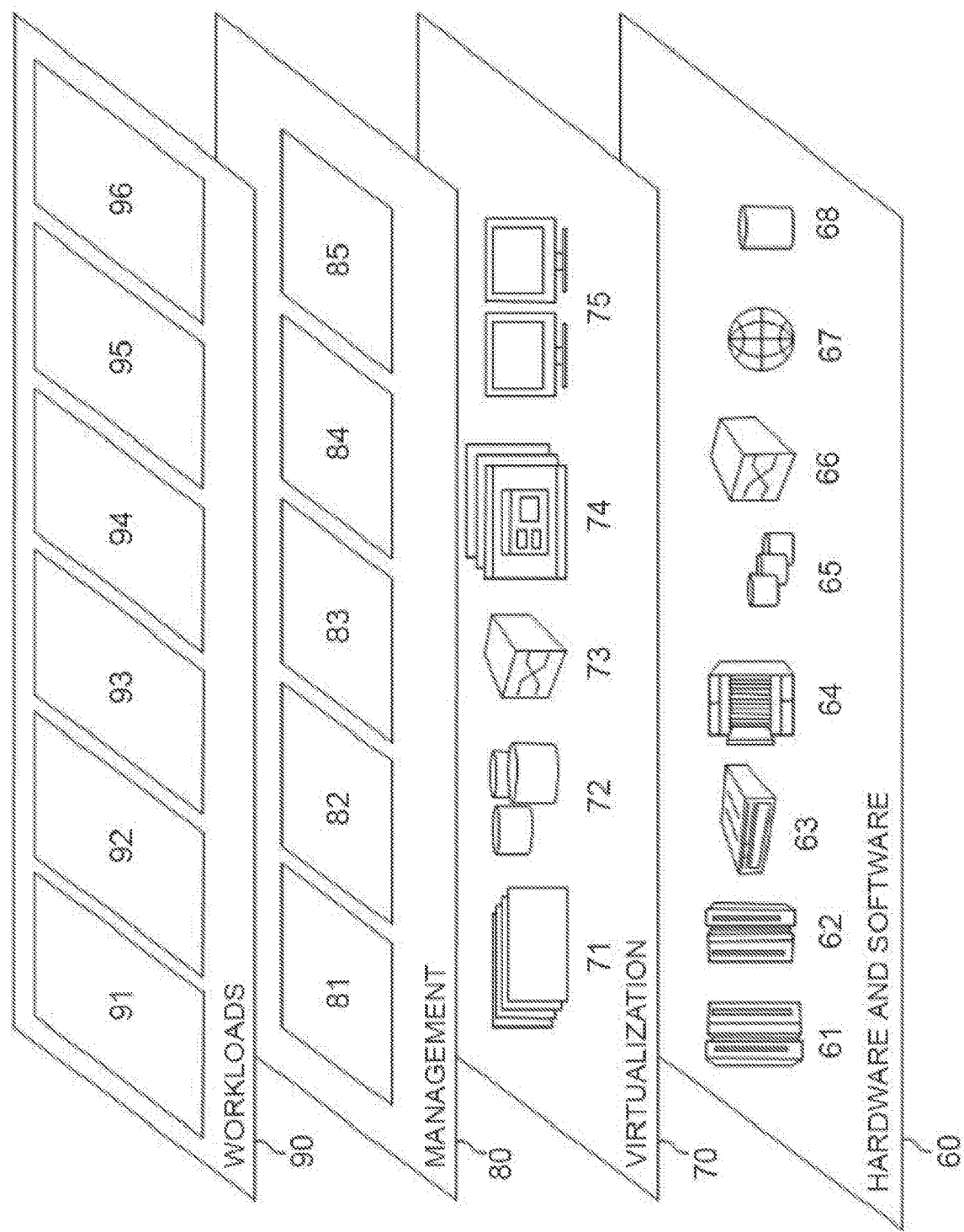
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a negotiative chat bot according to aspects of the present invention 96.

Figure 3:
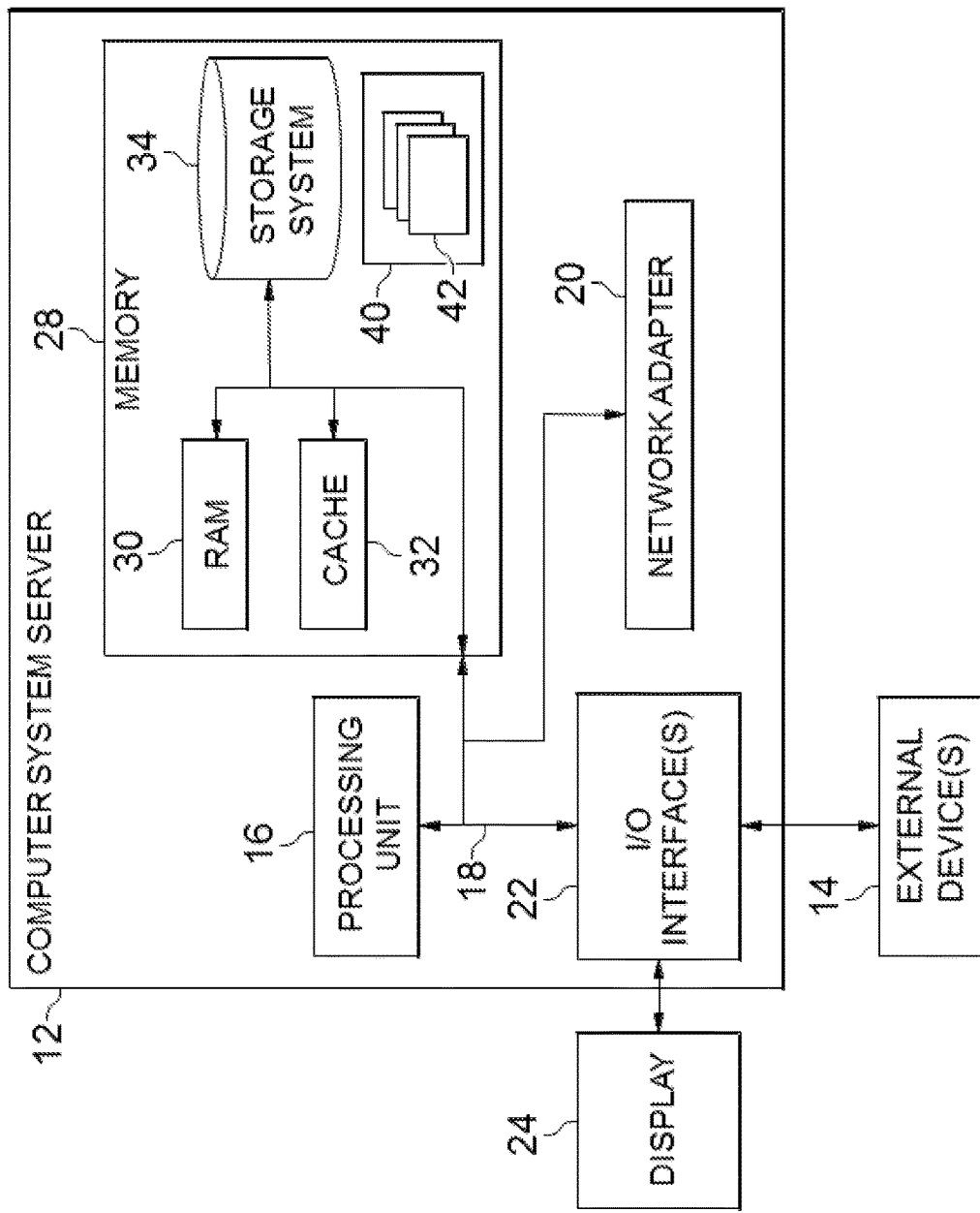
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
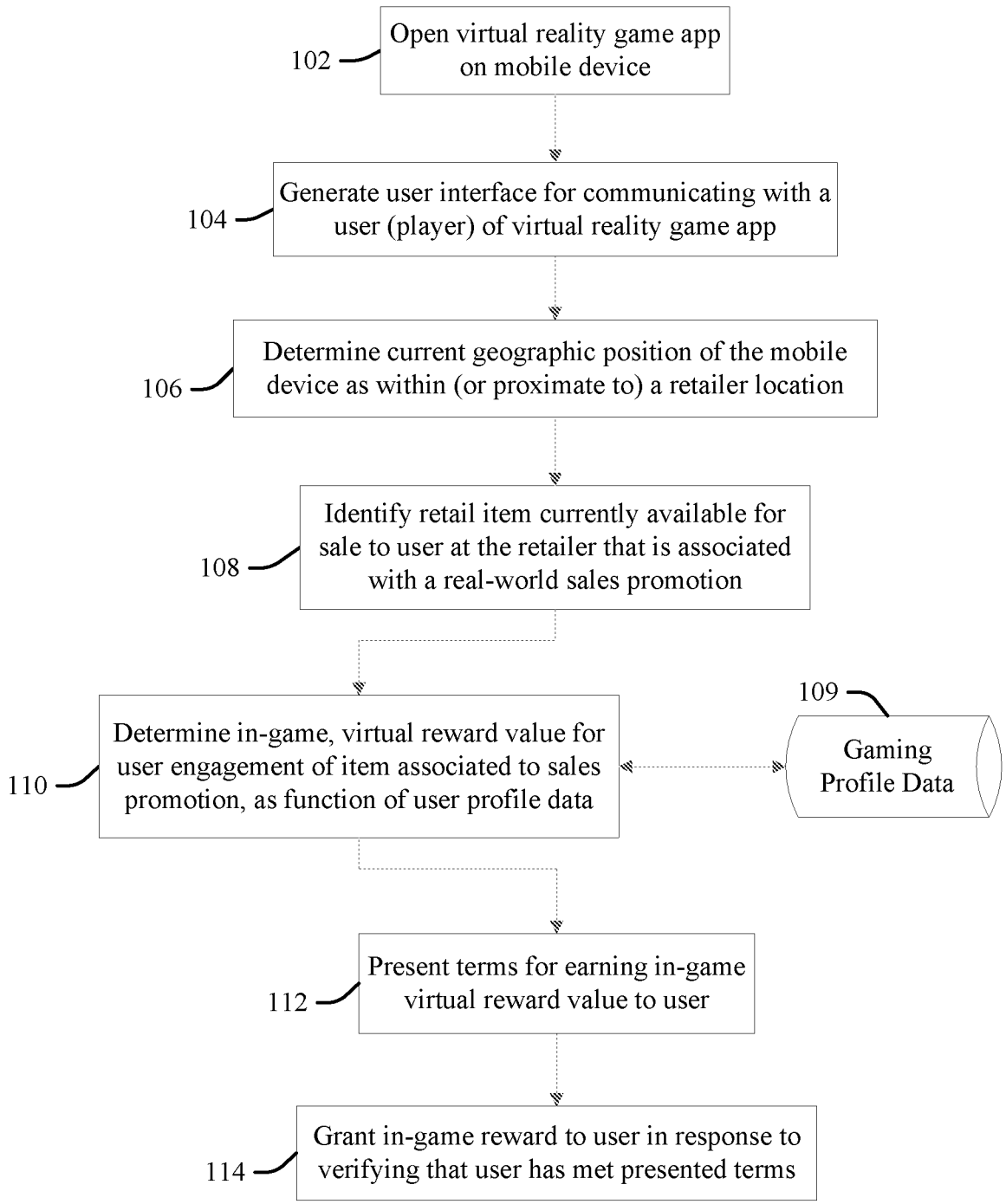
FIG. 4 is a block diagram illustration of an embodiment of the present invention.

FIG. 4 illustrates a system, process, or device according to an embodiment of the present invention. At 102 a mobile device processor that is configured according to the present invention (the "configured processor") invokes, executes or opens a virtual reality game application ("app") that is configured according to the present invention.

At 104 the configured processor generates a user interface for communicating with a user (player) of the virtual reality game app. Examples include an application window displayed on a touchscreen device of a smart phone, and an augmented reality interface that is incorporated within visual and audio data presented to the user by immersive googles, smart glasses or another augmented reality display device.

At 106 the configured processor determines, identifies or locates the current geographic position of the mobile device (or the user utilizing or operating the mobile device and virtual reality game app) as within (or proximate to) a retailer location: for example, within a store, or within a proximate threshold distance defined in terms of distance, travel time, or some other parameter to the store, a kiosk, a mobile sales or promotional vehicle, a food truck, etc. Location determination may be based on global positioning satellite (GPS) coordinates, cellular communication data associated with towers of known locations, Wi-Fi or RFID communications with beacons and receivers and base stations within the retailer location, and still other location services will be apparent to one skilled in the art.

At 108 the configured processor identifies one or more retail items (goods or services) that are currently available for sale to the user at the retail location retailer and associated with a real-world sales promotion. Real-world sales promotion associations may differentiate the item from other items and encourage sales by awarding a monetary rebate, or a direct single item or volume sales discount, defined by the retailer, or a wholesaler or manufacturer of the item. The rebate or discount may be awarded to the end user as consumer, to the retailer as merchant, to a supplier or wholesaler supplying or stocking the item at the retailer. Sales promotions may also be determined or identified by the configured processor (arise automatically) at 108 as a function of date or time: for example, in response to determining that the current date is within a threshold number of days from an expiration date identified for a sales item (for example, within one week for a perishable food item, or sixty days for an item within a shipment of dry goods that have common expiration dates, etc.).

At 110 the configured processor determines an in-game, virtual reward value for awarding to the virtual game app player (mobile device user) in consideration for engagement with the item (purchase, physically manipulate or inspect, etc.) that is associated to the sales promotion at 108, wherein the amount and type of the virtual reward value is determined as a function of user Gaming Profile Data 109 (a local or remote memory storage device, or network or cloud services, etc.). Generally, the in-game reward value is determined at 110 to be independent of (decoupled from, or only indirectly related to) the sales price or value of the sales promotion associated to the item at 108, and is instead set to have a value (as indicated in historic user and other consumer behavior) that is sufficient to encourage the user to purchase or otherwise engage the item, as a function of historic gaming behavior and levels and achievement values within the Gaming Profile Data 109, either uniquely and personally, or as determined from other users who share demographic identity indicia with the user (for example, same age range, occupation, annual income, annual average item purchase activity, etc.).

While tracking in-game behavior and transactional activity for a user and storing such data in the Gaming Profile Data 109 is generally beneficial to the user (for example, enabling the creation of an in-game reward at 110 that the user is more likely to value highly), embodiments generally enable users to opt-out of such behavior-tracking functionality at any time, wherein their activities are not tracked or otherwise observed to generate data stored in the Gaming Profile Data 109.

At 112 the configured processor presents the terms of the in-game virtual reward value determined at 110 to the game player: for example, sending an in-game message or alert to the user that relates what the user must purchase, and in what amounts, in order to earn specific amounts of in-game reward values. At 114 the configured processor grants the in-game reward to the user in response to verifying that the user has met the terms presented at 112: for example, in response to appropriate credit card account purchase activity reported by the retailer, or to a submission by the user of evidence of the engagement activity (for example, providing a unique identification number or icon located on the product packaging, logging in and playing a game demo for a specified minimum amount of time), etc.

Figure 5:
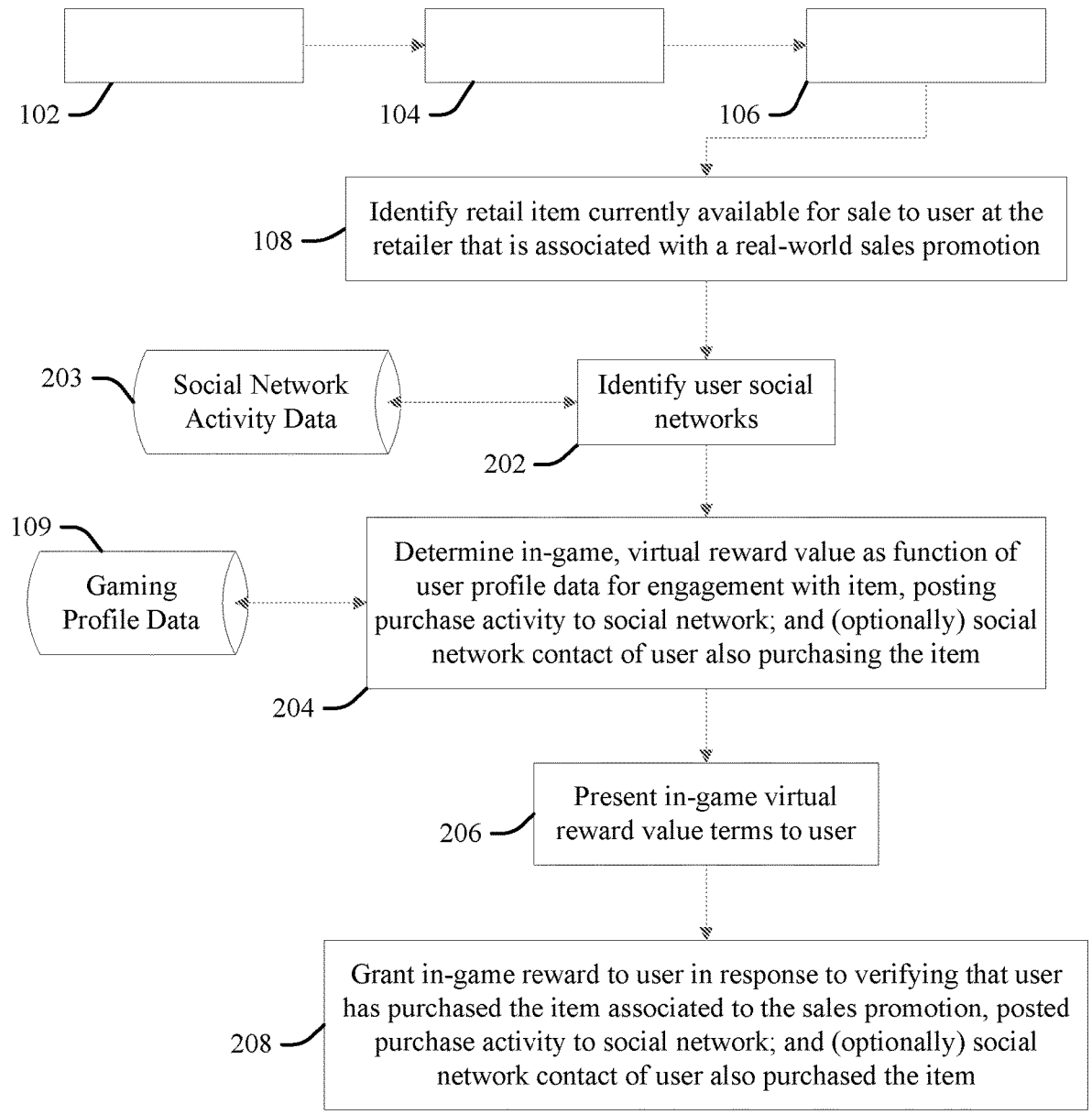
FIG. 5 is a block diagram illustration of another embodiment of the present invention.

FIG. 5 illustrates another embodiment according to the present invention, which includes the processes at 102, 104 and 106 as described above with respect to FIG. 4, and wherein, subsequent to the process at 108 of identifying retail items (goods or services) that are currently available for sale to the user at the proximate retail location retailer and associated with a real-world sales promotion, at 202 a mobile device processor that is configured according to the present invention (the "configured processor") identifies one or more social networks that the user belongs to, as indicated in a Social Network Activity data source 203 (a local or remote memory storage device, or network or cloud services, etc.).

At 204 the configured processor determines an in-game, virtual reward value for awarding to the user as virtual game app player that is appropriate to a current game status of the user (in view of their Gaming Profile Data 109 history, current game points and levels achieved, etc.) in consideration for engagement of the item associated to a sales promotion at 108, and posting the item engagement activity to their social network; and further, in some embodiments, wherein earning the reward is further conditional upon a contact of the user within the social network also engaging (purchasing, etc.) the item associated to the real-world promotion.

While tracking social network activity for a user and storing within, or otherwise accessing the Social Network Activity Data 203 is generally beneficial to the user (for example, enabling the creation of an in-game reward at 204 that the user is more likely to share with other contacts, and thereby enhance the value of his or her social network activity), embodiments generally enable users to opt-out of such social network activity tracking at any time, wherein their activities are not tracked or otherwise observed to generate data stored in the Social Network Activity Data 203.

At 206 the configured processor presents the terms of the in-game virtual reward determined at 204 to the user (sending an in-game message or alert to the user that relates what the user must purchase, and in what amounts, and content of an associated social network posting, and terms of additional engagement requirements for social contacts, etc.).

At 208 the configured processor grants the in-game reward to the user in response to verifying that the user (and their social contacts, as necessary) has met the engagement and social network posting terms presented at 206: for example, in response to appropriate credit card account purchase activity reported by the retailer, to a submission by the user of evidence of the purchase activity, to verifying social network posting activity and linked purchases by social network contacts, etc.)

Thus, by incorporating social network data the embodiments of FIG. 5 may encourage users to increase their social network activity, to correspondingly increase amounts or opportunities of earning in-game rewards in proportion to increases in posting activities that identify the items they purchased or are considering purchasing at a store. The reward values determined at 204 may be specified by a social network provider, in order to encourage further user activity, or by product retailers, by encouraging direct advertisement of the quality of the item to the friends in social contacts of the user as consumer.

Accordingly, social-network based reward terms may be defined affinity agreements or programs at 204: for example, if one of the friends or contacts of the user also buys the item, or picked it up in exams it at a store, etc., the user is given an in-game reward. Sharing through social networks or within the gaming environment itself may also increase the values of the in-game reward incentives: for example, a power-up earned at 208 may continually increase in point value with every additional purchase or re-posting of posted purchase activity by a social contact of the user, and wherein the linked contacts also benefit by gaining the increased point values as other contacts virally re-post an original post, or make additional item purchases that are linked back to their social contacts.

Teammates within a game environment that incorporates a social, team-play component directly in the game may also share in the benefits of the actions of one teammate, wherein one purchase results in the award of in-game rewards to all of the teammates. The values may depend on the numbers of other contact purchases, or, conversely, require a minimum number of purchases for any member to earn a reward: for example, "if two of the team members buy item X, then each of you gets an increase in health by an amount Z."

Cooperative rewards may be granted in a common, crowd-funding goal: for example, each individual item purchase is considered a milestone achievement, resulting in granting some in-game value, and wherein additional values are granted when a goal of "Y" items is ultimately purchased by teammates, social contacts, friends, etc.

Embodiments of the present invention decouple the real-world, monetary value of the item purchase from a value of the in-game reward value that is perceived by the user as game player, in view of his or her gaming profile data. Embodiments interact with user gaming profile data inclusive of in-game purchasing and retail item purchasing preferences and purchase history data; game play behaviors, levels obtained, powers and points accrued in the game, etc. Thus, embodiments design and tailor reward terms (at 110 of FIG. 4, or at 204 of FIG. 5) to meet user expectations (for example, to offer an appropriate level-up reward, one not already earned by the user within the game, or subject to a previous offer that the user did not find appealing enough to accept in the past), and having sufficient in-game value to encourage the user to purchase the real-world item to gain the in-game benefits.

Granting of an in-game reward (at 114 of FIG. 4, or at 208 of FIG. 5) may include revising the game-playing environment to offer additional rewards or incentives to the user (for example, the same activities may accrue more points or in-game values, including for a specific, temporary "level-up" time period granted as part of the reward. When the granted reward improves the perceived game-playing experience for the user, this correspondingly (proportionately) encourages the user to increase amount of engagement with the game (total time, duration, number of games played, etc.), which creates corresponding increases in marketing opportunities for retailers (to have additional items identified at 108 for use in forming new in-game reward offers.

For example, in-game rewards granted by embodiments may include helping the user achieve game objectives, for example, open a locked door to move to a next, higher game level; providing information needed to solve a puzzle; acquiring additional avatar or virtual pet health; unlocking new levels of character (avatar or virtual pet, etc.) abilities, advancing the user along a story arc, or a total point value, to an ultimate objective; acquiring new or better power attributes that are used to perform tasks or evolutions within the game environment; enabling additional personalization or customization of the game character (avatar or virtual pet, etc.), such as selecting different apparel items; unlocking tools or other items useful within the game playing environments, such as wrenches or other hand tools to increase repair abilities of the avatar, or medical kits to increase the ability to increase avatar health levels, or ward off illness; additional food items, virtual currency, etc.

Some embodiments determine in-game reward values as a function of specific item location within the retailer location. For example, within a grocery store retailer items are differentially placed in, specific shelving tier locations relative to vertical location: generally on a bottom shelf or range of shelves, a middle shelf or range of shelves, or on upper shelf or range of shelves. Vertical shelf location selection is typically a function of differentially targeting the user as a retail customer, wherein retailers may charge different stockage fees to product suppliers based on relative differences in perceived desirability or value to the supplier for different locations.

Thus, breakfast cereal that is preferred by children is generally placed on the bottom shelf, where in it is most easily seen and accessible to the child (due to their smaller height or stature relative to an adult) relative to the middle and upper shelves, thereby increasing the likelihood that the child will find the desired product, and physically retrieve the product from the shelf for placement in a shopping cart. In contrast, it is generally preferred to place products targeted to adults on middle shelving, as they are more likely to see the product, and to be comfortably able to retrieve the product, without stooping over to see and remove the product from the lower shelving, or straining to see or reach and comfortably pick up products on high shelves. Accordingly, embodiments design different in-game incentives based on different shelving tier product locations: for example, in response to determining that the user is an adult, enhancing the in-game value of the reward relative for lower or upper shelving tier product locations, relative to a reward associated to purchase of another product located at a middle shelving tier location.

Products most likely to be sought by the user are also often located in most remote locations from the entrance doors within a retail store, in order to encourage the consumer to travel down other isles and see offers for other products in the intervening retail spaces between the front door and the desired product. For example, in grocery stores milk and milk products are most commonly purchased, and accordingly, they are usually located in a far corner of the store from the front door.

Thus, embodiments utilize product shelving tier location, in-store locations relative to most desired products and/or proximity to ingress and egress doors, expiration date, sales rates or churn data to determine in-game reward values in amounts that vary proportionately to add additional incentive or encouragement to consumers to purchase items from less desirable locations, or that are not selling as quickly as other competing products, or that are closer to their expiration date (for example, setting the value of the in-game reward amount in inverse proportion to an amount of days prior to an approaching expiration date).

Embodiments may uncouple values of the in-game rewards from proportionate relationships to the real-world cost or value of the purchase transaction of a specific retail item that is associated to the reward. For example, an embodiment creates a first incentive reward associated to purchase or consideration of first item with a first retail cost of "X" that is higher in terms of gameplaying environment reward value than a second reward generated and associated to a second, different retail item at the establishment that has a retail or transactional cost of "Y" that is greater than the price "X" of the first item.

Embodiments may limit in-game reward offers as a function of user identity or demographic data values, for example, limiting or prohibiting direct marketing to minors of specific in-game reward values or types in response to parental control settings. Thus, embodiments may terminate finalization of an initial offer (at 110, FIG. 4 or at 204, FIG. 5) in response to determining that the user is a minor and that an initially selected in-game reward has a "hard" or direct financial monetary value (for example, reward points that may be redeemed for "cash back" from a game service provider, or "skill values" that may be sold for cash on a secondary market to other game players for association to their avatars and use within the game); the embodiment finalizes the offer presented by replacing the initially determined in-game reward with a "soft" reward that has no monetary value, wherein the value is instead limited to the gameplaying environment and non-transferrable to other users (for example, extra lives, new apparel options, new pet food options for a virtual pet, etc.).

Embodiments extend consumer incentive mechanisms beyond purchasing or marketing techniques taught by the prior art. Thus, embodiments may design, and present in-game reward offers that encourage users to try out or consider a product. For example, a user is deemed to accept the offer and receive rewards (at 114, FIG. 4 or at 208, FIG. 5) by picking up a product off-the-shelf or physically manipulating or inspecting the product, as evidenced indirectly by identifying unique product markings located on the product, such as by reading material on the product that is not visible without handling the item (for example, opening a book cover to read a code printed on an inside book cover jacket). Thus, the embodiment may grant an in-game reward to the user in response to the user finding a specific product placement within the environment of the store, and reporting an attribute that indicates that the user physically examined the item (via inputting text content into a window or field entry box, or selecting a radio button associated to an icon, or speaking into a microphone of a smart phone, wherein the content of the speech is determined through speech to text processing by the configured processor) that identifies the color or pricing or models available on the shelf at that location, or unique or special markings (icons, unique alphanumeric codes) incorporated into item packaging by the manufacture or retailer, and in some offers wherein the content is not readily obtainable without picking the item up and examining the item, thereby indirectly requiring the user to physically engage the items. Such a physical manipulation represents a "soft" or indirect marketing to the user: by picking up the item, the user may be more likely to decide to purchase the item: based on already having an item in their physical control, users are encouraged to add the item to a shopping cart rather than putting it back on the shelf, in response to perceiving an attractive attribute of the product packaging through physical examination that is more likely to encourage the user to purchase the item relative to merely viewing the product on a shelf.

Embodiments may also combine in-game rewards with real-world, external reward values that are outside of the gaming environment. For example, embodiments may combine an in-game reward with free shipping of the item purchased, or membership points or rewards or discounts or coupons that the user can apply to purchases of other products in the retail establishment or at some other retail interface.

One advantage of the present invention over prior art item marketing is that users may be granted in-game "discounts" that have no actual monetary cost to the retail establishment or product provider. In contrast to the prior art, wherein use of a coupon results directly in a discounted price, and therefore lower net revenue for the retailer, embodiments reward points within virtual gaming environments while the consumer as user agrees to pay the full normal retail price for the item that is coupled to the endgame award. Thus, the rewards have no actual cost to provider, and may even result in direct benefits, such as through additional advertising revenue realized from increased user participation within internet service provider services to gain access to the gaming environment, or for ads presented within the game environment itself, or via generating increased social network posting activity, which results in corresponding increases in free product advertising within the posting activity, etc.

Illustrative but not limiting or exhaustive examples of in-game rewards according to the present invention include the following. In response to determining that a user is located within a specific aisle in a grocery store, the embodiment generates within a virtual pet game app executing on a mobile device of the user an incentive to buy a cake mix that is located on a middle shelf of the aisle, presented within a text content message from the virtual pet: "Today is my Birthday! Buy a Brand X cake mix to celebrate by unlocking Party Mode!".

Attributes of products may be utilized and associated to gaming environment options: for example, another incentive presented within a text content message from the virtual pet of "Buy these sandals and unlock the Beach theme" associates the product to beach and summer-season activities within the game environment. Embodiments may also directly link or couple grocery items to food or other substance for the virtual pet: for example, "Meow-cat loves fish snack treats! Buy Brand X trail mix snack packs, and Meow-cat will get 10 free fish treats!", or "Meow-cat likes to eat healthy, and wants you to do so too! Buy Brand X Spinach today and Meow-cat will get one extra life!"

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
in response to determining that a mobile device of a user is within a threshold location proximity to a retailer location, identifying an item that is offered for sale at the retailer location in association with a sales promotion;
determining an in-game virtual reward value for awarding to the user within a virtual game that is executing on the mobile device as a function of gaming profile data of the user;
in response to an input of the user of an attribute value of the item, determining that the user has executed an engagement of the item that comprises performing one or more interact actions with the item by physically manipulating the item, and visually examining the physically manipulated item, wherein the input value refers to attributes associated with the item that are made viewable when the user physically manipulates the item;
identifying a social network that includes the user as a member; and
presenting an offer to the user within the virtual game to award the determined in-game virtual reward value to the user in response to determining that the engagement by the user performing the one or more interact actions with the identified item meets a term of the sales promotion and to determining a posting of activity associated to the item engagement activity to the social network for publication to a social network contact of the user.

2. The method of claim 1, further comprising:
presenting the offer to the user in response to determining that the engagement by the user performing the one or more interact actions with the item meets the term of the sales promotion comprises at least one of purchasing the item, identifying unique product markings located on the product, and trying a product demonstration mode for a minimum engagement time.

3. The method of claim 1, further comprising:
identifying the sales promotion in response to determining that a current date is within a threshold number of days from an expiration date identified for the item offered for sale; and
wherein the determining that the engagement by the user with the item meets the term of the sales promotion is responsive to determining that the engagement comprises purchasing the item.

4. The method of claim 1, further comprising:
conditioning the award of the determined in-game virtual reward value to the user upon determining that a threshold plurality of other users also engage the identified item pursuant to a term of the sales promotion.

5. The method of claim 1, further comprising:
identifying a plurality of teammates of the user within the virtual game;
specifying content of a social network posting in the offer to the user pursuant to the term of the sales promotion; and
determining an amount of in-game virtual reward value awarded to the user in proportion to a total number of the teammates that engage the identified item pursuant to the term of the sales promotion.

6. The method of claim 1, wherein the in-game virtual reward is selected from the group consisting of advancing the user to a higher game level, providing information needed to solve a puzzle within the game, acquiring additional health values, unlocking a new level of abilities of a game character, and enabling additional personalization or customization of the game character.

7. The method of claim 1, further comprising:
determining an amount of the in-game virtual reward value as function of a specific shelving location of the identified item within the retailer location.

8. The method of claim 1, further comprising:
determining a real-world reward value that has value to the user external to an environment of the virtual game; and
presenting the offer to the user to award the real-world reward value to the user in combination within the in-game virtual reward value in response to the determining that the engagement by the user performing the one or more interact actions with the identified item meets the term of the sales promotion.

9. The method of claim 8, wherein the real-world value is selected from the group consisting of free shipping for a purchase of the item, membership points, membership rewards, and a discount that the user can apply to a purchase of another item offered for sale by the retailer.

10. The method of claim 1, further comprising:
conditioning the award of the determined in-game virtual reward value to the user upon determining that the social network contact of the user engages the identified item pursuant to a term of the sales promotion.

11. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the identifying the item that is offered for sale at the retailer location in association with the sales promotion, the determining the in-game virtual reward value for awarding to the user within the virtual game executing on the mobile device as the function of gaming profile data of the user, the determining that the user has executed the engagement of the item, and the presenting the offer to the user within the virtual game.

12. The method of claim 11, wherein the computer-readable program code is provided as a service in a cloud environment.

13. A computer system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   in response to determining that a mobile device of a user is within a threshold location proximity to a retailer location, identifies an item that is offered for sale at the retailer location in association with a sales promotion;
   identifies a plurality of teammates of the user within a virtual game that is executing on the mobile device;
   specifies content of a social network posting in an offer to the user pursuant to the term of the sales promotion;
   determines an in-game virtual reward value for awarding to the user within the virtual game that is executing on the mobile device as a function of gaming profile data of the user, wherein an amount of the in-game virtual reward value is in proportion to the total number of the teammates that engage the identified item pursuant to the term of the sales promotion;
   in response to an input of the user of an attribute value of the item, determines that the user has executed an engagement of the item that comprises performing one or more interact actions with the item by physically manipulating the item, and visually examining the physically manipulated item, wherein the input value refers to attributes associated with the item that are made viewable when the user physically manipulates the item; and
   presents the offer to the user within the virtual game to award the determined in-game virtual reward value to the user in response to determining that the engagement by the user performing the one or more interact actions with the identified item meets a term of the sales promotion.

14. The system of claim 13, wherein the processor executes the program instructions stored on the computer-readable storage medium via the computer readable memory and thereby:
   presents the offer to the user in response to determining that the engagement by the user performing the one or more interact actions with the item meets the term of the sales promotion comprises at least one of purchasing the item, identifying unique product markings located on the product, and trying a product demonstration mode for a minimum engagement time.

15. Thesystem of claim 13, wherein the processor executes the program instructions stored on the computer-readable storage medium via the computer readable memory and thereby:
   identifies a plurality of teammates of the user within the virtual game;
   specifies content of a social network posting in the offer to the user pursuant to the term of the sales promotion; and
   determines an amount of in-game virtual reward value awarded to the user in proportion to a total number of the teammates that engage the identified item pursuant to the term of the sales promotion.

16. The system of claim 13, wherein the in-game virtual reward is selected from the group consisting of advancing the user to a higher game level, providing information needed to solve a puzzle within the game, acquiring additional health values, unlocking a new level of abilities of a game character, and enabling additional personalization or customization of the game character.

17. A computer program product, comprising:
   a computer readable storage medium having computer readable program code embodied therewith, the computer readable program code comprising instructions for execution by a processor that cause the processor to:
   in response to determining that a mobile device of a user is within a threshold location proximity to a retailer location, identify an item that is offered for sale at the retailer location in association with a sales promotion;
   determine an in-game virtual reward value for awarding to the user within a virtual game that is executing on the mobile device as a function of gaming profile data of the user;
   in response to an input of the user of an attribute value of the item, determines that the user has executed an engagement of the item that comprises performing one or more interact actions with the item by physically manipulating the item, and visually examining the physically manipulated item, wherein the input value refers to attributes associated with the item that are made viewable when the user physically manipulates the item;
   identify a social network that includes the user as a member; and
   present an offer to the user within the virtual game to award the determined in-game virtual reward value to the user in response to determining that the engagement by the user performing the one or more interact actions with the identified item meets a term of the sales promotion and to determining a posting of activity associated to the item engagement activity to the social network for publication to a social network contact of the user.

18. The computer program product of claim 17, wherein the computer readable program code instructions for execution by the processor further cause the processor to:
   determine a real-world reward value that has value to the user external to an environment of the virtual game; and
   present the offer to the user to award the real-world reward value to the user in combination within the in-game virtual reward value in response to the determining that the engagement by the user performing the one or more interact actions with the identified item meets the term of the sales promotion.

* * * * *